(12) United States Patent
Burns et al.

(10) Patent No.: US 6,442,132 B1
(45) Date of Patent: Aug. 27, 2002

(54) HIGH AVAILABILITY ATM VIRTUAL CONNECTIONS

(75) Inventors: John C. Burns, Los Altos, CA (US); David Watkinson; Jonathan Bosloy, both of Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/230,038

(22) PCT Filed: Jul. 17, 1997

(86) PCT No.: PCT/CA97/00507

§ 371 (c)(1),
(2), (4) Date: Sep. 23, 1999

(87) PCT Pub. No.: WO98/04097

PCT Pub. Date: Jan. 29, 1998

(30) Foreign Application Priority Data

Jul. 17, 1996  (GB) ............................................. 9614987

(51) Int. Cl.[7] ................................................ H04L 12/26
(52) U.S. Cl. .......................... 370/218; 370/228; 370/397
(58) Field of Search ................................ 370/216, 217, 370/218, 219, 220, 225, 226, 227, 228, 235, 236, 236.2, 237, 238, 238.1, 395.1, 396, 397, 395.5, 395.51

(56) References Cited

U.S. PATENT DOCUMENTS

| 5,412,376 | A | * | 5/1995 | Chujo et al. | 370/228 |
| 5,671,215 | A | * | 9/1997 | Foglar | 370/227 |
| 5,712,847 | A | * | 1/1998 | Hata | 370/228 |
| 5,715,237 | A | * | 2/1998 | Akiyoshi | 370/228 |
| 5,870,382 | A | * | 2/1999 | Tounai et al. | 370/220 |

* cited by examiner

*Primary Examiner*—Ricky Ngo
(74) *Attorney, Agent, or Firm*—Marks & Clerk

(57) ABSTRACT

A method of establishing and maintaining a connection through an asynchronous cell-based network having a plurality of switching nodes, comprises setting up a first bi-directional path between source and destination endpoints through one or more switching nodes, setting up an alternate bi-directional path between the endpoints, and switching from the first path to the alternate path by first causing the destination endpoint to send cells back to the source endpoint over the alternate path while still receiving cells over the first path. When the source endpoint receives an indication that the destination endpoint has transferred to the alternate path, it sends cells from the source endpoint to the destination endpoint to complete the transfer to the alternate path.

11 Claims, 2 Drawing Sheets

HIGH AVAILABILITY ATM VIRTUAL CONNECTIONS

BACKGROUND OF THE INVENTION

1. Field of the Invention

This invention relates to the field of packet-based networks, such as ATM (asynchronous transfer mode), and more particularly to a method for establishing virtual connections that experience minimal downtime in the network.

2. Description of Related Art

The use of ATM by a continuously widening set of applications is driving a requirement for very robust, highly available connections. Mission critical applications require that ATM virtual connections(VCs) experience very low or no down time when reacting to network failures or network maintenance operations. These ATM virtual connections come in three forms: PVCs (Permanent Virtual Connections), and dynamic on-demand SVCs (Switched Virtual Connections) and SPVCs (Soft Permanent Virtual Connections). SVCs are set up on demand via a signalling protocol and are not automatically re-established after a system restart. SPVCs are signalled PVCs which are set up on demand via a signalling protocol. These PVCs are automatically re-established after a system restart. SVCs and SPVCs enable a network to setup connections on-demand via signaling and routing without the aid of a centrally managed network management platform and are, thus, more robust and efficient than PVCs as the call processing is distributed. SVCs and SPVCs reroute around network failures as soon as the failures are detected. When reacting to network failures, SVCs and SPVCs are tom down, and resignalled and rerouted around the failure. Even though today current ATM connection management strategy using SVCs and SPVCs enjoy an order of magnitude better rerouting performance than a network management platform can provide with PVCs, rerouting performance is still not adequate for mission critical applications where high availability virtual connections are required.

Ryutaro Kawamura et al. in an article entitled "Self-Healing ATM Networks Based on Virtual Path Concept" in an article in IEEE Journal on Selected Areas in Communications, vol. 12, no. 1, January 1994, pages 120–127 describe a network wherein alternate virtual paths with zero bandwidth are set up between terminating switching nodes for use in the event of a network failure. However, Kawamura only discusses unidirectional paths and teaches that in the event of network failure a restoration message must be sent along the backup VP before transmission can occur. This process can involve significant service interruption.

SUMMARY OF THE INVENTION

An object of the invention is to provide an arrangement that that enables VCs to experience low or no down time for VCs recovering from network failures during from network maintenance and optimization operations.

According to the present invention there is provided a method of maintaining communication, in an asynclronous cell-based digital comununications network having a plurality of switching nodes, between first and second endpoints attached to respective endpoint switching nodes during transfer between a primary bi-directional virtual connection established over a first route between said endpoints and a secondary bi-directional virtual connection available over an alternate route through said network comprising the steps of establishing a precursor secondary virtual connection between said first and second endpoints over said alternate route, said precursor secondary virtal connection consisting of unidirectional connections in the receive direction at said endpoint switching nodes and bi-directional connections between said endpoint switching nodes and progressively switching to said secondary bi-directional virtual connection by sequentially establishing a bi-directional connection at said first endpoint switching node, transmitting cells toward the second endpoint switching node over said alternate route, establishing a bi-directional connection at said second endpoint switching node upon receipt of an indication over the alternate mute that the first endpoint switching node has transferred to the alternate route, and transmitting cells toward the first endpoint from the second endpoint over the alternate route to complete the transfer of communication between said first and second endpoints to said secondary bi-directional virtal connection.

This arrangement for the handling of network failures and maintenance operations ensures that a backup or alternate data path exists for each mission critical virtual connection. However, when the alternate data path is setup, the determination of how and when to switch to the alternate path is different depending on whether a network fault is being processed or a maintenance operation is processed. If a maintenance operation is being processed then a first mechanism, known as a Bridge and Roll, is used. If a network reroute is being processed. then a second mechanism, known as a RAPID mechanism, is used.

The establishment of an alternate backup VC combined with an efficient determination and mechanism to switch to the alternate path ensures very high availability of mission critical VCs, much more so than waiting for each VC to be resignalled and routed.

BRIEF DESCRIPTION OF THE DRAWINGS

The invention will now be described in more detail, by way of example, only with reference to the accompanying drawings, in which.

DETAILED DESCRIPTION OF THE PREFERRED EMBODIMENTS

Figure 1:
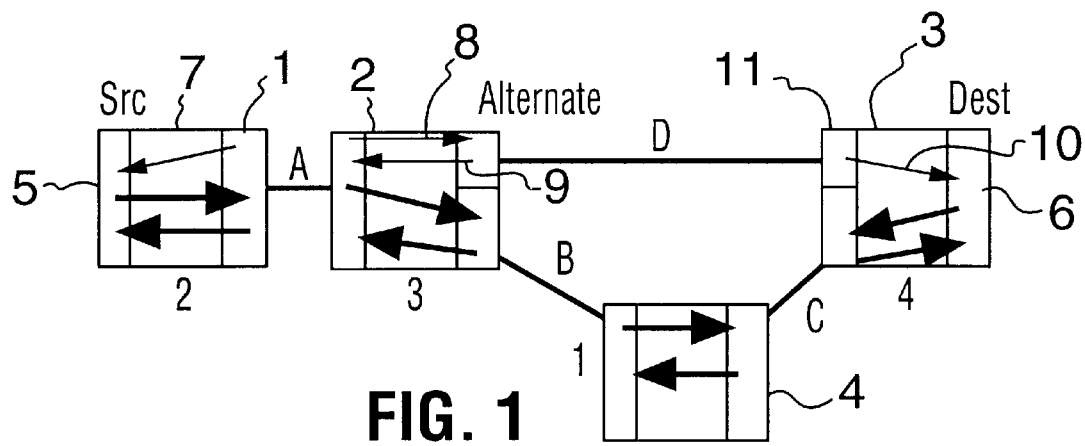
FIG. 1 shows the setting up of the bridge in a bridge and roll mechanism in an ATM network.

Referring to FIG. 1, an ATM network includes switch nodes 1, 2, 3, 4, for example, Newbridge Networks Corporation 37170 switches, interconnected by trunks A, B, C, D.

Figure 4:
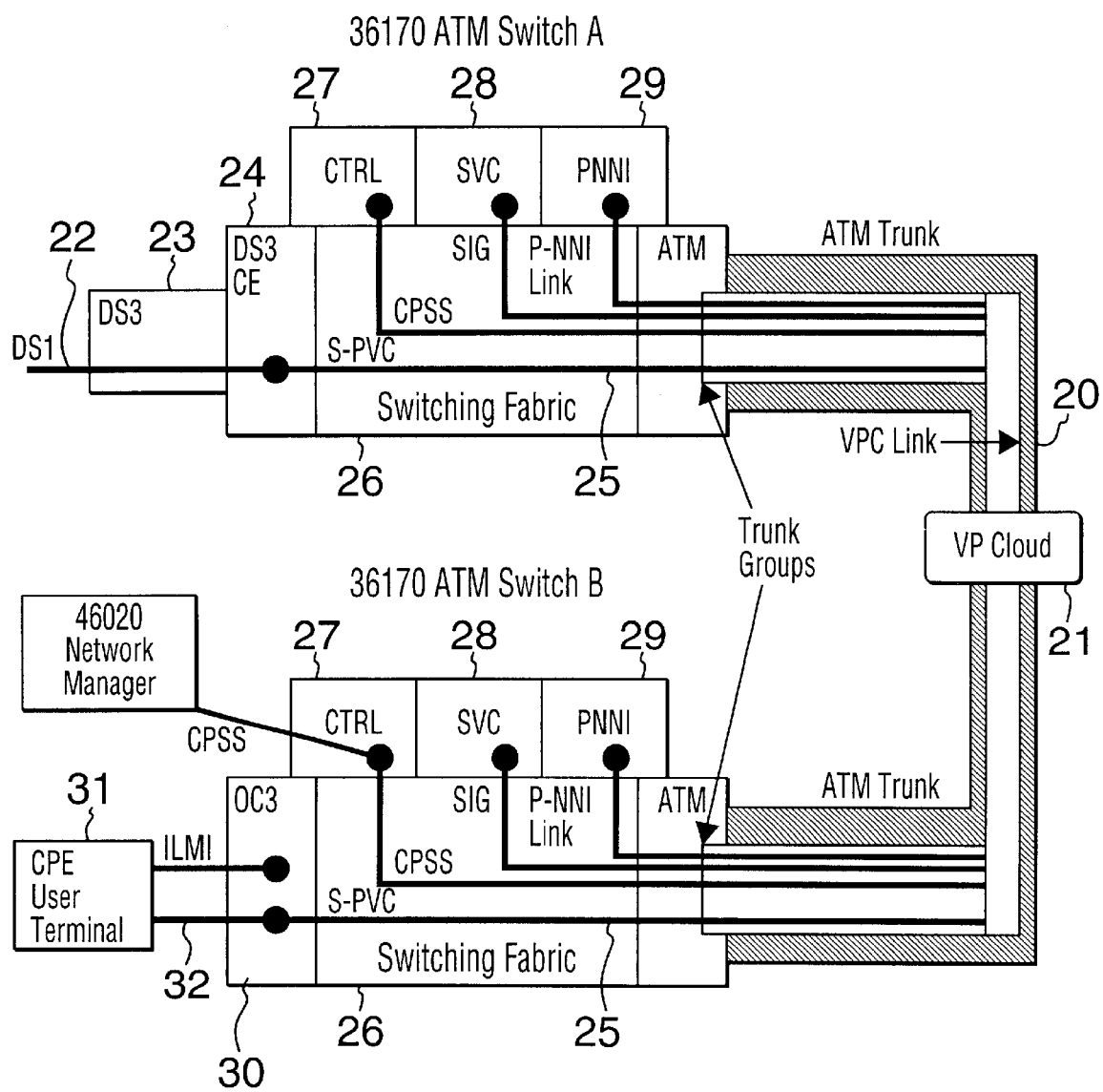
FIG. 4 shows the physical arrangement of an ATM switch in more detail.

FIG.4 shows the physical arrangement in more detail. As shown in FIG. 4, the ATM Switch A is connected to AIM switch B over an AIM trunk 20 with virtual path cloud 21 carrying the virtual connections. ADS ITDM trunk 22or DS3 TDM trunk 23 is connected to circuit emnulation card 3. A signaled permanent virtual circuit 25 extends through the switching fabric 26 to the ATM trunk 20.

The switch A also includes a control card 27 supporting CPSS (Control Packet Switching System), a service card 28, and a P-NNI (Private Network Node Interface) card 29.

The switch B is similar to the switch A except that a 46020 network manager is connected to the control card via a CPSS link.

The S-PVC 25 carried over the ATM trunk extends through the switching fabric of switch 26 to OC3 circuit 30 which produces an OC3 TDM signal for transfer to the customer user terminal 31 over an ILMI (Interim Local Management Interface) 32.

The P-NNI Interface is a protocol for use between private ATM switches. P-NNI includes a protocol for distributing topology information between switches and clusters of switches, used to compute paths through the network, and a signalling protocol used to over from primary to alternate can take place, then a minimal or even no service interruption occurs.

There are two reasons for bridge and roll—optimise and maintenance. Reroutes in a network tend to leave the network in a sub-optimal state after a sequence of equipment failure and recovery. SPVCs are routed around equipment failure and left in that state when the equipment recovers and thus become sub-optimally routed. At some point, it is desirable to get the SPVC back on the most optimal route as unnecessary bandwidth is being consumed by an SPVC taking more hops than necessary. To minimise the service hit to the path, a bridge and roll operation can be done on the path.

The other reason for bridge and roll is to take equipment out-of-service for maintenance. Consider a series of paths that are routed over a Trunk Group on an OC3 card. If the OC3 card requires an upgrade, then a bridge and roll maintenance operation can be performed on all SPVCs on the trunk group to minimise service interruption.

In FIG. 1, an original path is setup along the trunks A, B, C with bi-directional connections at the source 5 and destination 6 endpoints. This path takes three hops versus an optimal two hops. The path uses the route indicated by the bold arrows.

An alternate path is setup over an alternate route by routing a new path along the top two trunks A, D. A uni-directional cross-connect 7 is made at the source endpoint for the alternate path The source and destination endpoints still transmit over the original route. The alternate connects 8, 9 are indicated by a regular arrow. This si referred to as a precursor bi-directional path because it bridges two endpoints but is not complete in either direction at this point.

The middle switch 2 now has two independent bi-directional cross-connects 8, 9. The source switch has provisioned resources for two concurrent paths over the same physical trunk A. This is temporarily done until the roll operation occurs.

The destination switch sets up the last leg of its route but it too makes a uni-directional cross-connect 10 from the line card 11 toward the destination endpoint.

This sequence completes the bridge.

Figure 2:
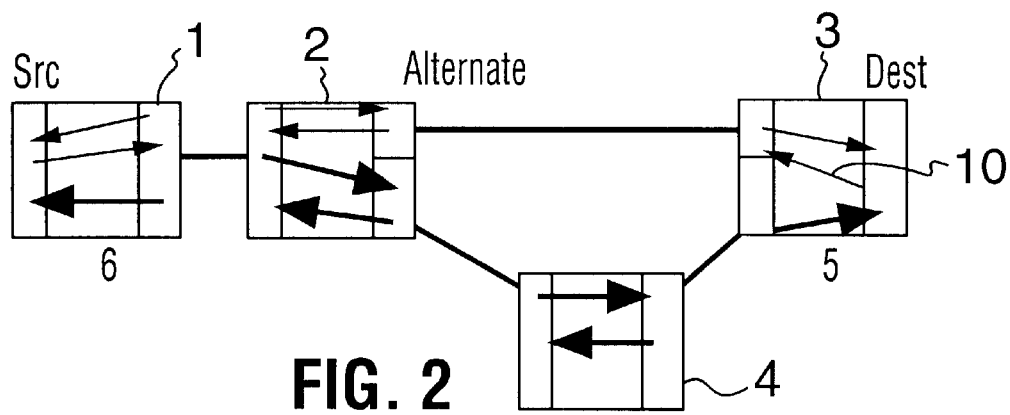
FIG. 2 shows the system rolling to the alternate.

As shown in FIG. 2, when a bridge request reaches the destination, a roll is required because the new route is cheaper than the original route assuming equal administrative weight on all trunks. The destination switch 3 rolls its cross-connect 10 to the alternate path. It does this by changing the line card to which it transmits. At this The middle switch 2 now has two independent bi-directional cross-connects 8, 9. The source switch has provisioned resources for two concurrent paths over the same physical trunk A. This is temporarily done until the roll operation occurs.

The destination switch sets up the last leg of its route but it too makes a uni-directional cross-connect 10 from the line card 11 toward the destination endpoint.

This sequence completes the bridge.

As shown in FIG. 2, when a bridge request reaches the destination, a roll is required because the new route is cheaper than the original route assuming equal administrative weight on all trunks. The destination switch 3 rolls its cross-connect 10 to the alternate path. It does this by changing the line card to which it transmits. At this point, the source is transmitting over the original route but it is receiving cells over the alternate route. The destination now indicates back to the source that it has rolled to its alternate.

When the source receives the indication that the destination had rolled, the source rolls to its alternate. At this point, only the alternate path is used and no data is being sent over the original path.

Figure 3:
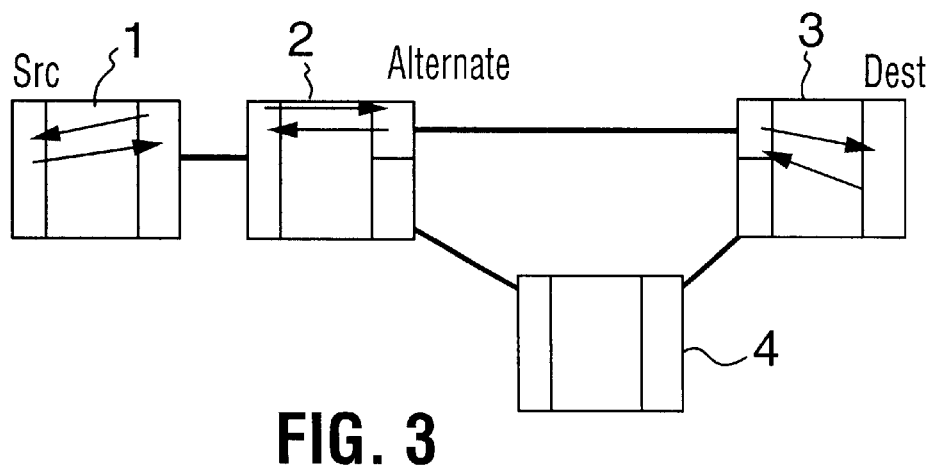
FIG. 3 shows the bridge and roll mechanism in the final state.

This sequence completes the roll. FIG. 3 shows the final state of the bridge and roll operation.

The original path is then released thus freeing up the bandwidth used by the original route.

For whatever reason, in both the optimise and maintenance operations, if the alternate SPVC path cannot be successfully routed, then the original path is left alone.

The example above illustrates the optimise operation. If an alternate path cannot be successfully routed, then the existing path remains active. The current administrative weight of the SPVC path being optimised is used when routing the alternate. Anywhere along the path, the alternate can be rejected because it weighed more than the original SPVC path.

There exist scenarios in which there appears to be an optimal route for the SPVC path but the alternate SPVC path cannot be routed optimally. Because the alternate SPVC is routed as a completely independent path, thus using new cross-connects and bandwidth, an optimal route may be discarded due to CAC (Connection Admission Control) failures. If this is the case, then the alternate may end up on an even more costly route than the original and hence the original path is unaffected.

The maintenance operation behaves similarly to the optimize functionality except the destination always rolls to the alternate if the path can be successfully routed. The following procedure illustrates the use of bridge and roll maintenance.

The equipment undergoing maintenance is placed in a courtesy down state such that no new SPVCs are routed over the equipment and additionally, existing paths are not affected. Then, each SPVC running over the equipment to-be-maintained is bridged and rolled. Because the new alternate SPVCs will not take the route that the original took as routing ensures that administratively disabled equipment is avoided, the path is routed around the disabled equipment.

The service interruption for a bridge and roll operation is quantified as follows. When an SPVC path is bridged and rolled, the possibility exists for cell loss or cell reordering in two locations. The first occurs when the switch is made at the destination, and second when the switch is made at the source. The service impact to CPE equipment is, of course, application dependent. Example: a CES application may experience a framing error if cells are lost or misordered and thus realize potentially a severely errored second in each direction.

The cell loss may occur when the source or destination reconnects its transmit to the alternate path. The cell loss may occur if cells were being transmitted at the time of the switch. Cell re-ordering may occur when the end to end cell delay of the alternate path is less than that of the original path. Again, this is dependent on the frequency of cell flow when the switch to the alternate occurs.

Note that a switch at either end may occur such that no cells are lost or misordered and thus no interruption is perceived by the maintenance operation.

Reserved Alternate Path with Interruption Detection (RAPID) is similar to bridge and roll. However, for a mission critical virtual connection, both a primary and an alternate path are setup at VC creation time. Also, the endpoints transmit data only on the primary path. To handle a network fault, as soon as the endpoints detect a fault, a switch

What is claimed is:

1. A method of maintaining communication, in an asynchronous cell-based digital communications network having a plurality of switching nodes, between first and second endpoints attached to respective endpoint switching nodes during transfer between a primary bi-directional virtual connection established over a first route between said endpoints and a secondary bi-directional virtual connection available over an alternate route through said network, comprising the steps of:

establishing a precursor secondary virtual connection between said fit and second endpoints over said alternate route, said precursor secondary virtual connection consisting of unidirectional connections in the receive direction at said endpoint switching nodes and bi-directional connections between said endpoint switching nodes; and progressively switching to said secondary bi-directional virtual connection by sequentially establishing a bi-directional connection at said first endpoint switching node, transmitting cells toward the second endpoint switching node over said alternate, establishing a bi-directional connection at said second endpoint switching node upon receipt of an indication over said alternate route that the first endpoint switching node has transferred to the alternate route, and transmitting cells toward the first endpoint from the second endpoint over the alternate route to complete the transfer of communication between said first and second endpoints to said secondary bi-directional virtual connection.

2. A method as claimed in claim 1, wherein an intermediate node on said secondary virtual connection contains bi-directional cross-connects establishing said bi-directional connection between said endpoint switching nodes in said precursor secondary virtual connection.

3. A method as claimed in claim 1, wherein said unidirectional connections to said endpoints are established as unidirectional cross connects to said respective endpoints at said respective endpoint switching nodes.

4. A method as claimed in claim 1, wherein said primary virtual connection is released after the successful completion of the transfer to said secondary virtual connection to free up resources used by the primary virtual connection.

5. A method as claimed in claim 1, wherein said secondary virtal connection is a switched virtual connection (SVC).

6. A method as claimed in claim 5, wherein said secondary virtual connection is a switched permanent virtual connection (SPVC).

7. A method as claimed in claim 1, wherein said transfer is effected for the purpose of optimizing the routing through the network.

8. A method as claimed in claim 7, wherein the alternate route of said secondary virtal connection is chosen in order to optimize routing weights.

9. A method as claimed in claim 1, wherein said transfer is effected as a result of a failure in said primary connection.

10. A method as claimed in claim 1, wherein said transfer is effected as a result of CAC (Connection Admission Control) failure.

11. A method as claimed in claim 1, wherein said transfer to said second a connection is effected for the purpose carrying out maintenance on the resources used by the first virtual connection.

\* \* \* \* \*